No. 666,026. Patented Jan. 15, 1901.
C. B. RICHARDS.
THROTTLE VALVE.
(Application filed Mar. 21, 1900.)
(No Model.)
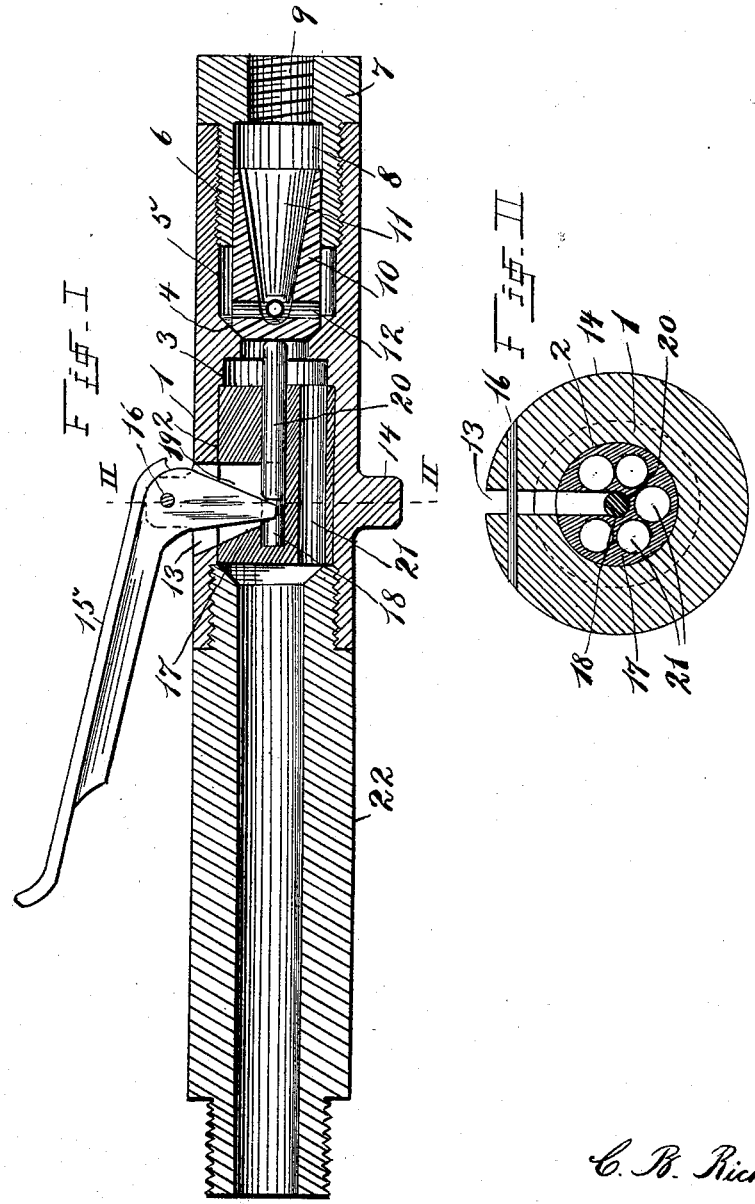
WITNESSES:
H. J. Bingham
C. L. Path
C. B. Richards,
INVENTOR,
Wm. Leclair
Attorney.

UNITED STATES PATENT OFFICE.

CHARLES B. RICHARDS, OF CLEVELAND, OHIO, ASSIGNOR TO THE CLEVELAND PNEUMATIC TOOL COMPANY, OF SAME PLACE.

THROTTLE-VALVE.

SPECIFICATION forming part of Letters Patent No. 666,026, dated January 15, 1901.

Application filed March 21, 1900. Serial No. 9,526. (No model.)

*To all whom it may concern:*

Be it known that I, CHARLES B. RICHARDS, a citizen of the United States, and a resident of Cleveland, county of Cuyahoga, and State of Ohio, have invented certain new and useful Improvements in Throttle-Valves, of which the following is a specification, the principle of the invention being herein explained and the best mode in which I have contemplated applying that principle, so as to distinguish it from other inventions.

The annexed drawings and the following description set forth in detail one mechanical form embodying the invention, such detail construction being but one of various mechanical forms in which the principle of the invention may be used.

In said annexed drawings, Figure I represents an axial section of my improved valve, and Fig. II a transverse section on the line II II in Fig. I.

A cylindrical casing 1 is formed with a cylindrical bore 2, having an annular shoulder 3 near its rear end, with a constricted rearwardly-facing annular valve-seat 4 and a cylindrical bore 5, having its rear end screw-threaded, as at 6, for the reception of a threaded and shouldered valve-guide block 7, having a bore 8 and a shouldered and tapped bore 9. A cylindrical valve 10 slides in the bore 8 and has a beveled forward end which fits against the annular valve-seat and a forwardly-tapering recess 11, open at the rear end and communicating with the bore in the valve-casing through radiating channels 12 from the bottom of the recess. The casing has a radial slot 13 and has an annular flange 14 formed around it at that point, and an L-shaped lever 15 is fulcrumed at its elbow upon a pin 16, inserted through the flange and slot to have its short arm project into the slot. A cylindrical block 17 is fitted into the bore 2 of the casing and has an axial bore 18, closed at its forward end, and a radial slot 19 for the lever-arm extending from said bore. A pin 20 fits to slide in the axial bore and has its rear end bearing against the forward end of the valve and has the arm of the lever bearing against its forward end. The block has a number of longitudinal passages 21 through it. A tubular connection 22 for attaching the valve to the device or conduit to which fluid is to be admitted under control of the valve is screwed into the forward end of the casing 1 and serves also to retain the passage-block 17 in its bore and to hold it against the shoulder.

When the valve structure is connected at its tapped rear end to a source of fluid under pressure, the force of the fluid will drive the valve forward, closing it with the pressure. If the fluid is under slight pressure or no pressure, a spring may be provided to close the valve. When fluid is to be admitted through the valve, the outer arm of the lever is pressed toward the valve-casing, causing the inner arm to force the pin rearward, and thereby forcing the valve rearward. The fluid passes through the tapering recess in the valve and out through the radial channels into the space in the valve-chamber surrounding the valve. As soon as the valve is slightly forced from its seat, the pressure on the valve is substantially equalized, and the valve may be easily moved back to admit a free flow of fluid. The fluid will pass through the passages of the block and to its destination after passing the valve and its seat. The fluid will not leak out through the slot in the casing, as a proper fit of the block in the bore in the casing and of the pin in the axial bore in the block will prevent any leakage. The valve is automatically closed when the handle is released, so that no particular attention needs be paid to closing off the flow of fluid, and fluid under pressure will keep the valve tightly closed, the closure increasing in tightness with the increase of pressure. The construction of the valve structure is simple, as all of the parts may be made upon a lathe and drill-press from simple cylindrical bars of metal. The valve structure is durable, as there are no projecting or irregularly-shaped parts excepting the lever, and the valve-plug will wear itself to a fit upon its seat. This valve structure is suitable for controlling any fluid; but it is particularly adapted for controlling air under pressure, and is especially designed as a throttle-valve for pneumatic drills or reamers or boring-machines, being capable of perfect control of the air and being automatically closing, so that the airsupply to the tool will be closed off the moment the tool is laid away and its use is stopped.

Other modes of applying the principle of my invention may be employed for the mode herein explained. Change may therefore be made as regards the mechanism thus disclosed, provided the principles of construction set forth, respectively, in the following claims are employed.

I therefore particularly point out and distinctly claim as my invention—

1. In a valve structure, the combination with a valve-chamber having a seat at the discharge end, a guide-bore at the inlet and an annular space between the seat and guide-bore, of a valve-plug freely sliding in the guide-bore to be forced against the seat by the inlet-pressure and having its end fitted to the seat and formed with a recess communicating with the inlet and with the annular space through channels in the sides of the plug and having means for moving it in the guide-bore against the inlet, substantially as set forth.

2. In a valve structure, the combination with a valve-chamber having a seat at the discharge end, a guide-bore at the inlet end and an annular space between the seat and guide-bore, of a valve-plug freely sliding in the guide-bore to be forced against the seat by the inlet-pressure and having its end fitted to the seat and formed with a tapering recess open to the inlet and having channels from said recess to the annular space, and means for sliding the valve-plug against the inlet, substantially as set forth.

3. In a valve structure, the combination with a valve-chamber having a seat at one end, a guide-bore at the opposite end and a space between said seat and guide-bore, of a valve-plug fitted to freely slide in the guide-bore to be forced against the seat by the inlet-pressure and having one end fitted to the seat and having a passage through the other end to the space in the chamber, and means for longitudinally moving the valve-plug, substantially as set forth.

4. In a valve structure, the combination of a casing having a cylindrical bore formed with a valve-seat at one end and with a radial slot, a valve playing against said seat, a block fitted in the bore and having an axial bore and passages through it and formed with a radial slot registering with the slot in the casing and entering the axial bore, a pin sliding in the axial bore and engaging the valve to operate the same, and a lever fulcrumed upon the casing and having one arm projecting through the radial slots to engage the pin, substantially as set forth.

5. In a valve structure, the combination of a valve-seat, a valve-guide opposed to the seat and having a fluid-opening at its end, a valve fitted to slide in said guide and formed with a fluid-passage from its other end out through its side, a passage around the end of the valve to the seat, and means for moving the valve, substantially as set forth.

6. In a valve structure, the combination of a casing formed with a cylindrical bore and a cylindrical valve-chamber and a valve-seat between said bore and chamber and having a radial slot through its side into the bore, a cylindrical block fitted in said bore and formed with an axial bore and a radial slot into said bore and with longitudinal passages through it, a pin sliding in said bore, a valve-guide in the end of the valve-chamber and having inlet at one end, a valve sliding in said guide and formed with a recess opening to the inlet and channels through the sides and having one end fitted to the seat and the pin bearing against said end, an L-shaped lever fulcrumed upon the casing to have one arm project through the radial slots and bear against the pin, and a tubular connection screwed into the casing and confining the cylindrical block in the bore of the latter, substantially as set forth.

In testimony that I claim the foregoing to be my invention I have hereunto set my hand this 14th day of February, A. D. 1900.

CHARLES B. RICHARDS.

Witnesses:
WM. SECHER,
K. C. WINDING.